US008468262B2

(12) United States Patent
Furbeck

(10) Patent No.: US 8,468,262 B2
(45) Date of Patent: Jun. 18, 2013

(54) METHOD AND APPARATUS FOR UPDATING HTTP CONTENT DESCRIPTIONS

(75) Inventor: David Stuart Furbeck, Keller, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 163 days.

(21) Appl. No.: 12/917,431

(22) Filed: Nov. 1, 2010

(65) Prior Publication Data

US 2012/0110201 A1 May 3, 2012

(51) Int. Cl.
*G06F 15/16* (2006.01)
(52) U.S. Cl.
USPC .......................... 709/231; 709/232; 709/234
(58) Field of Classification Search
USPC .................. 709/200–203, 217–234
See application file for complete search history.

(56) References Cited

U.S. PATENT DOCUMENTS

| 7,984,112 | B2 * | 7/2011 | Huang ............................ 709/218 |
| 8,015,169 | B1 * | 9/2011 | Gmuender et al. ............ 707/706 |
| 2011/0096828 | A1 * | 4/2011 | Chen et al. ............... 375/240.02 |
| 2011/0231519 | A1 * | 9/2011 | Luby et al. ..................... 709/219 |
| 2011/0231569 | A1 * | 9/2011 | Luby et al. ..................... 709/234 |
| 2011/0238789 | A1 * | 9/2011 | Luby et al. ..................... 709/219 |
| 2011/0239078 | A1 * | 9/2011 | Luby et al. ..................... 714/752 |
| 2012/0151009 | A1 * | 6/2012 | Bouazizi et al. .............. 709/219 |
| 2013/0007223 | A1 * | 1/2013 | Luby et al. ..................... 709/219 |

OTHER PUBLICATIONS

International Searching Authority, International Search Report and Written Opinion, issued for International Patent Application No. PCT/US2011/0585544, mailed on Dec. 22, 2011, 9 pages.
"Universal Mobile Telecommunications System (UMTS); LTE; Transparent end-to-end Packet-switched Streaming Service (PSS); Protocols and codecs (3GPP TS 26.234 version 9.4.0 Release 9)", ETSI TS 126 234 v9.4.0, Technical Specification, Oct. 2010, 190 pages.

* cited by examiner

*Primary Examiner* — Moustafa M Meky
(74) *Attorney, Agent, or Firm* — Hanley, Flight & Zimmerman, LLC

(57) ABSTRACT

A client device and a server receive and send a presentation streamed via HTTP. The client device sends a content request and the server receives the content request. The client device receives and the server sends a first presentation description based on the content request, wherein the presentation description comprises a fetch interval. The client device requests or otherwise receives a second presentation description before a duration associated with the fetch interval is exceeded.

28 Claims, 6 Drawing Sheets

METHOD AND APPARATUS FOR UPDATING HTTP CONTENT DESCRIPTIONS

FIELD OF TECHNOLOGY

The present invention relates generally to hypertext transfer protocol (HTTP) streaming, and more particularly to a method and apparatus for updating HTTP content descriptions.

BACKGROUND

A hyper text transfer protocol (HTTP) streaming client uses HTTP GET requests to download one or more presentations of media. The presentation as described in an extensible markup language (XML) document (e.g., 3GPP SA4 specification) may also be referred to as a Media Presentation Description (MPD). From the MPD, the client can learn in what formats the media content is encoded (e.g. bitrates, codecs, resolutions, languages). The client then chooses a format based on one or more of screen resolution, channel bandwidth, channel reception conditions, language preference of the user, etc.

With HTTP streaming, the media is downloaded a portion at a time. This is necessary for live content so that playout of the content does not fall too far behind live encoding. It also enables the client to switch to a different content encoding adaptively according to channel conditions, etc. Segments, in accordance with 3GPP HTTP Adaptive streaming, are downloadable portions of the media whose locations (URL and possibly a byte range) are described in the MPD. In other words, the client is informed how to access the segments via the MPD.

In accordance with 3GPP, the HTTP streaming client assumes the use of the 3GPP file format and movie fragments, wherein a segment contains one or more movie fragments. The 3GPP file format is based on the ISO/IEC 14496-12 ISO Base Media File Format. Files consist of a series of objects called boxes. Boxes can contain media or metadata. Each box has an associated boxtype (typically a 4 character name (32 bytes total)) and an associated size (typically a 32 bit unsigned integer). Movie fragments may consist of "moof"/"mdat" box pairs. The "moof" box contains metadata for a movie fragment and the "mdat" box contains media data for the movie fragment. The use of fragmented files enables the client to download the media a portion at a time, while minimizing startup delay by including metadata in the "moof" boxes of the media fragments as opposed to up front in the "moov" box. The "moov" box still contains a description of the codecs used for encoding, but does not contain any specific information about the media samples such as timing, offsets, etc.

BRIEF DESCRIPTION OF THE DRAWINGS

For a more complete understanding of the disclosure, reference is now made to the following brief description, in connection with the accompanying drawings and detailed description, wherein line reference numerals represent like parts.

DETAILED DESCRIPTION

Figure 1:
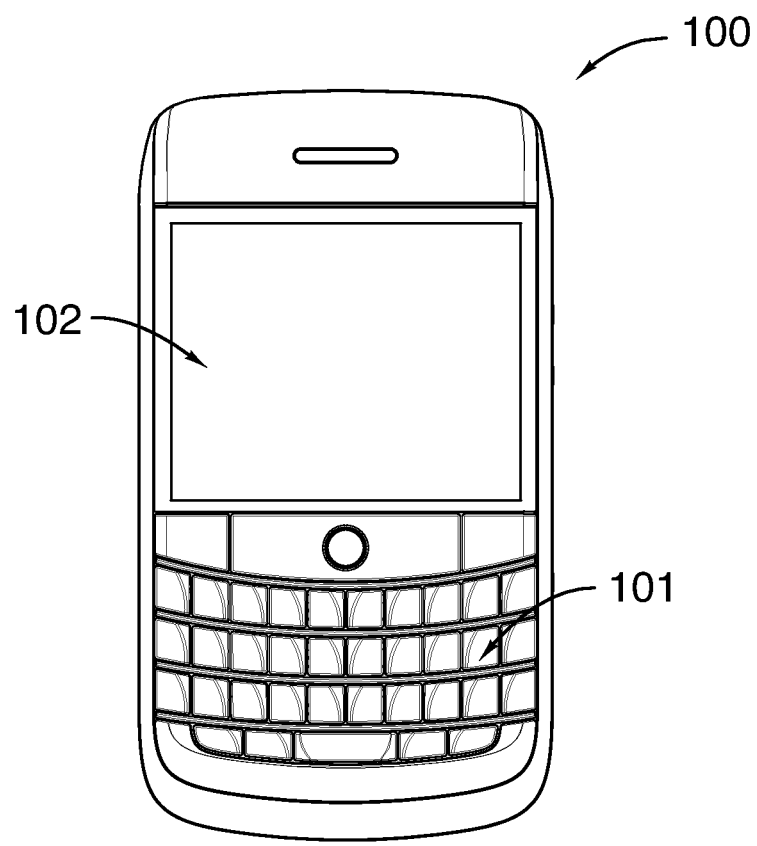
FIG. 1 is a diagram of a wireless handheld device configured to operate as a client in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

For HTTP streaming, the client is informed of the addresses of media segments via the MPD. The MPD may utilize a playlist structure or a template structure for the addresses of the media segments. In utilizing a playlist structure, the MPD will contain a uniform resource locator (URL) for each media segment within the MPD. In utilizing a template structure, the MPD will contain a description of how the client should construct URLs in order to access segments that will be created in the future.

When the playlist structure of the MPD is used with live streaming, the MPD is updated with the addresses of the newly encoded segments one or a few at a time. However, the client controls when it issues an HTTP GET or partial GET. Therefore, if a client has fetched the MPD 30 minutes into a live presentation and the user wants to watch from the beginning of the presentation, the client has all of the segment locations for the next 30 minutes. The client does not need to download a new MPD for approximately 30 minutes (at which point it would run out of data). A feature of the template structure of the MPD is that the client does not need to fetch the MPD at regular intervals. In this case, the client is informed through the MPD how to construct URLs in order to access segments that will be created in the future. For both of these use cases (when templates or playlists are used and the client tunes in late and wants to watch the presentation from the beginning), the client has no need to fetch the MPD at intervals that are on the same order of magnitude as the segment duration. For both of these use cases, it may be on the order of 30 minutes or more, for example, before the client needs new segment addresses which are provided by the MPD.

If the client is not required to fetch the MPD at any regular interval, then there is a risk of service interruption when the HTTP streaming service is migrated from one server to another. The HTTP streaming service will likely be interrupted unless the timeShiftBufferDepth (duration of the media segments whose addresses are given in the MPD, i.e. the total duration of content that the client can access at any given time) is provided in the MPD and is short, i.e., on the order of a minute or less. In this case, as new segments are added to the MPD, their addresses can correspond to the new server location and the segments corresponding to the old server will eventually fall out of the time window corresponding to the timeShiftBufferDepth. The timeShiftBufferDepth is an optional parameter in the MPD and a longer time shift buffer depth is useful to give clients a greater time range of stored content for viewing and seeking.

The MPD also includes certain parameters that require the client to have notice that they are going to change. One example is a minimumUpdatePeriod, which is an optional parameter in the MPD. The minimumUpdatePeriod informs the client that the server will not update the MPD at an interval shorter than minimumUpdatePeriod. For example, consider the case where minimumUpdatePeriod is 10 minutes and that the server updates the MPD at time 0, 10 minutes, 20 minutes, etc. Additionally, the client fetches the MPD at 5 minutes, 15 minutes, and 25 minutes. If at the MPD update of 20 minutes, the server changes the minimumUpdatePeriod to 1 minute, then when the client fetches the latest MPD at 25 minutes, it missed 4 updates. This is despite the fact that when the client fetched the MPD at 15 minutes, the value of minimumUpdatePeriod was 10 minutes. The server will not update more frequently than 10 minutes. Yet, when the client tunes in 10 minutes later, it finds that there have been 4 missed updates to the MPD.

The MPD can become large during live streaming based on the number of segments required for the presentation. A separate smaller check file could be placed on the server that indicates whether or not a service migration has occurred and whether any parameters have changed in the MPD. If a service migration has taken place, then the client can download the full MPD. The check file is useful for checking on a regular interval of "maximumMPDFetchInterval" in cases where service migrations are rare and downloading a full MPD would be burdensome for the client.

The information provided in the MPD guides the 3GPP Adaptive HTTP streaming client. A client successfully fetches an MPD when either the client obtains an updated MPD or the client verifies that the MPD has not been updated since the previous fetch.

The MPD comprises several parameters, including: newMPDLocation, maximumMPDFetchInterval, minimumUpdatePeriodMPD, and timeShiftBufferDepth.

newMPDLocation: detecting the presence of this parameter in the MPD by the client indicates a change in the location of the MPD. The MPD is maintained in both the previous location and the new location for a duration of at least maximumMPDFetchInterval. After receiving an MPD with the newMPDLocation attribute, the client must fetch the next MPD from the new MPD location indicated by newMPDLocation.

maximumMPDFetchInterval: this parameter specifies a maximum amount of time allowed between MPD fetches by the client. In other words, maximumMPDFetchInterval is a maximum fetch interval associated with how often the client device receives the MPD. When maximumMPDFetchInterval is present, the client fetches the MPD before a duration associated with this interval is exceeded. This allows for service migration and updating of certain MPD parameters with less risk of interrupting streaming service.

minimumUpdatePeriodMPD: this parameter provides the minimum period that the MPD is updated on the server. In other words, the minimumUpdatePeriodMPD is associated with how often parameters and references to segments are updated. If not present, the minimum update period is assumed to be infinite. If the value of minimumUpdatePeriodMPD is reduced, MPD update intervals continue to obey the previous longer value for a duration of at least maximumMPDFetchInterval after the MPD update when the reduced value first appears.

timeShiftBufferDepth: this parameter indicates the duration of the time shifting buffer that is available for a live presentation. In other words, it is the total duration of content that the client can access at any given time. When timeShiftBufferDepth is not present, the value is unknown. If it is present for on-demand services, this attribute shall be ignored by the client. If the value of timeShiftBufferDepth is reduced, all Segments within the time window of the previous longer value shall be maintained for a duration of at least maximumMPDFetchInterval after the MPD update when the reduced value first appears.

Additionally, a guard interval may be used. A guard interval is a duration added to the maximumMPDFetchInterval during which the server continues to maintain the previous location of the MPD and any content segments so as to avoid the interruption of HTTP streaming in cases where network latency delays the client's fetching of the MPD.

Requiring the client to fetch a new MPD at least as often as maximumMPDFetchInterval allows for the service to be migrated from one server to another as quickly as maximumMPDFetchInterval. The MPD can be updated so that segment locations correspond to the new server location. The content would exist in both locations for a duration of maximumMPDFetchInterval. After maximumMPDFetchInterval, the content creator can be sure that all clients have fetched the latest MPD and can begin removing segments from the original server. Alternatively, the server can be required to maintain the segments in both locations for a longer duration, e.g., a duration of maximumMPDFetchInterval plus a guard interval. This would allow the client to have some extra time since it needs to download a full MPD. This also allows for cases where the client requests an MPD before a duration of maximumMPDFetchInterval has elapsed, and the server does not receive the request until after the duration of maximumMPDFetchInterval has elapsed. One example is when there is high network latency. Additionally, the client does not have to fetch the MPD as often as the minimumUpdatePeriod, which may be shorter than maximumMPDFetchInterval, thereby conserving bandwidth.

There are many ways the client can initially find out about the MPD, one of which includes a click event on a browser link. Once the client has access to the MPD, the location of the MPD can be changed using a parameter called newMPDLocation, i.e., a presentation description location. This may be desirable when the service is migrated from one location to another. For example, the MPD and the segments themselves may be located on the same server. If the content creator wants to change the location of the MPD from one server to another, then it can indicate the URL of the new MPD location with the parameter newMPDLocation. When the client sees the newMPDLocation indicated in the MPD, then the client may? fetch all future MPDs from the URL indicated in newMPDLocation. As long as the server maintains the MPD in both locations for a duration of at least maximumMPDFetchInterval, then it can be sure that all clients are now fetching the MPD from the new location. Further, the duration associated with maximumMPDFetchInterval may be further associated with a guard interval, e.g., by adding the two intervals together to prevent the interruption of service even in cases where communication is slowed by network latency delays.

The parameter maximumMPDFetchInterval itself can be updated. If the original value of maximumMPDFetchInterval is "x" and the new value is "y", then if any parameters are updated or service migration is performed during the time the interval from when "y" first appears in the MPD to the time "y+x", the server should maintain the old values of the parameters or segments on the old server for a length of time equal to the greater of x or y. Additionally, the parameter maximumMPDFetchInterval can be associated with another parameter. An embodiment may have the maximumMPDFetchInterval be a number that is multiplied with the minimumUpdatePeriod to establish how often the client should fetch the MPD. In one example, the maximumMPDFetchInterval may be 1.2 and the minimumUpdatePeriod may be 10 minutes; in this case, the client would fetch the MPD every 12 minutes.

In the above description, the client pulls the MPD. Additionally or alternatively, the MPD may be pushed to the client such as in cases where the server maintains a state of the client. In one example, instead of requiring the client to perform consecutive fetches of the MPD at an interval not longer than maximumMPDFetchInterval, an OMA DM Management Object could be used for service migration and updating parameters in some cases. This could correspond to the case where a wireless carrier provides wireless communication services to a client device and also provides the HTTP Streaming Service to the client device. All clients on the carrier's network that have an OMA DM client and are also configured to consume the HTTP Streaming Service could have new parameters sent to them via a management object from the operator's DM server. For example, new values of newMPDLocation and minimumUpdatePeriod could be sent to and received by the client using an OMA DM Management Object. An indication that the client should fetch a new MPD immediately from a specific location could also be sent.

Embodiments of the disclosure may use the minimumUpdatePeriod like the maximumMPDFetchInterval. In such a case, the client would fetch the MPD before a duration associated with the minimumUpdatePeriod is exceeded. In this case, requiring the client to fetch a new MPD at least as often as the minimumUpdatePeriod allows for the service to be migrated from one server to another as quickly as minimumUpdatePeriod.

FIG. 1 is a diagram of a wireless handheld device configured to operate as a client in accordance with the present disclosure. The wireless handheld device 100 comprises a numeric keypad 101, a display 102 and one or more processors (not shown). The one or more processors of device 100 are configured to act as an HTTP streaming client and to perform the methods of the present disclosure. The device 100 can be configured to operate in accordance with various cellular telephone communications standards, including 3GPP.

Figure 2:
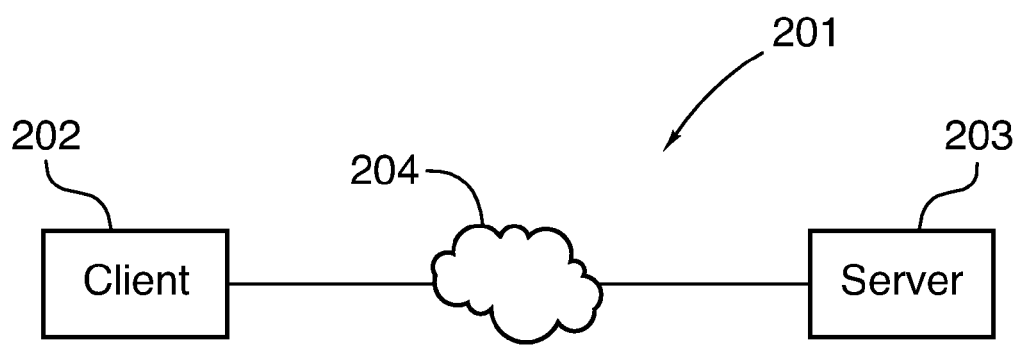
FIG. 2 is a diagram of a system configured to operate in accordance with the present disclosure.

FIG. 2 is a diagram of a system configured to operate in accordance with the present disclosure. The system 201 includes client 202 and server 203, which are communicatively connected via network 204.

The client 202 may be any device that is operable to receive a presentation in accordance with the disclosure. Examples of which include mobile telephones (e.g., wireless handheld device 100) and laptop computers operating in accordance with various 3GPP standards.

The server 203 may be any device that is operable to send a presentation description in accordance with the disclosure. Although it is depicted as a single server, server 203 may comprise multiple servers, computers, processors, memories and data stores. Server 203 may store the MPD and may also store the presentation in the form of one or more segments. Alternatively, the one or segments may be stored on or among different servers, memories and data stores, not shown.

The network 204 may be any type or style of network that provides for communication between the client 202 and the server 203. Examples of which include the Internet and public wireless carrier networks for mobile telephones.

Figure 3:
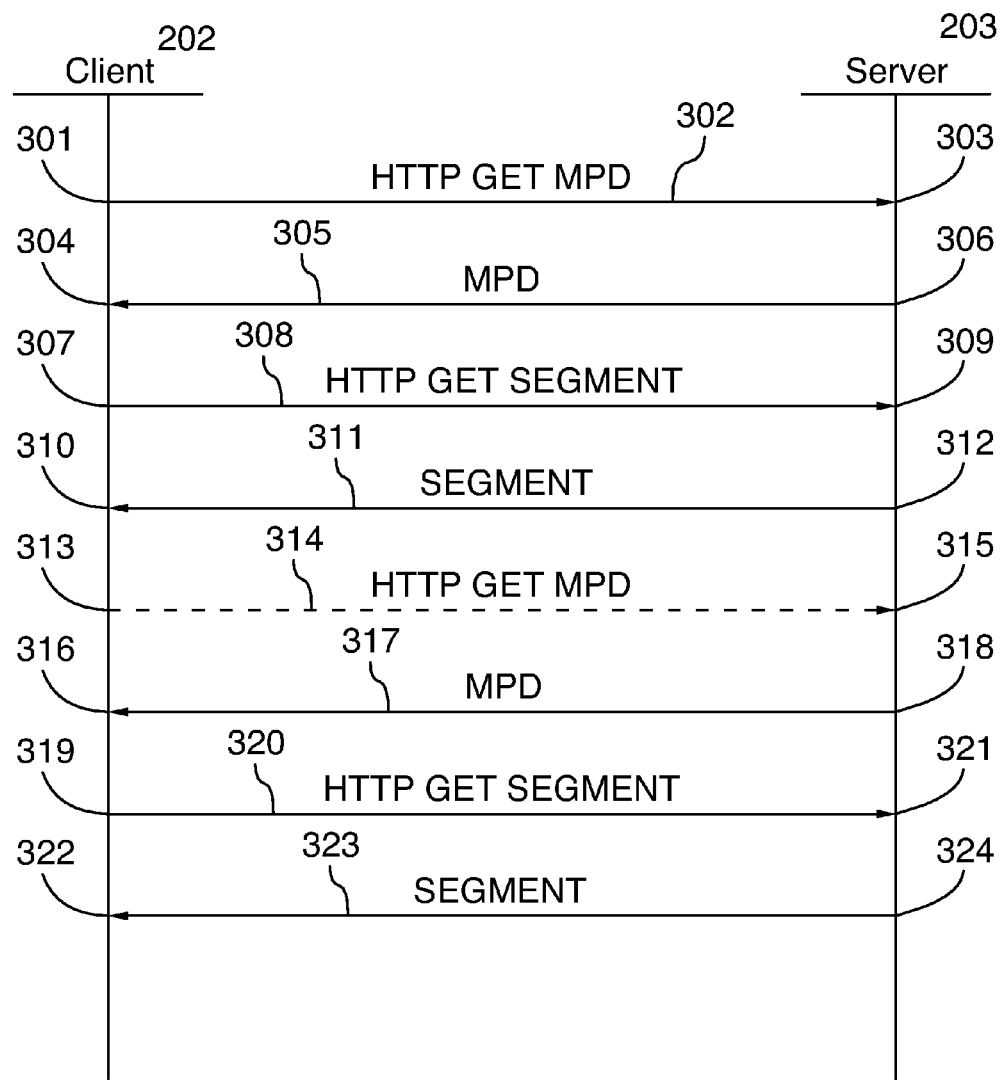
FIG. 3 is a diagram depicting the messages of a system configured to operate in accordance with the present disclosure.

FIG. 3 is a diagram depicting the messages of a system configured to operate in accordance with the present disclosure. At 301, the client 202 sends a content request, e.g. the HTTP GET request 302, for a presentation description, e.g., an MPD, to server 203. At 303, server 203 receives the HTTP GET request 302 for the MPD from the client 202.

At 304, the client 202 receives a first presentation description (MPD 305) from the server 203. At 306, the server 203 sends the first presentation description (MPD 305) to the client 304. The first presentation description (MPD 305) includes a fetch interval that establishes when a new MPD must be fetched or otherwise received by the client 202. The first presentation description (MPD 305) may also include a new presentation description location that establishes from where a new MPD must be fetched or otherwise received by the client. The MPD 305 also includes at least one reference to one or more segments associated with the presentation. Each segment is associated with a uniform resource locator (URL).

At 307, the client 202 sends one or more HTTP GET requests 308 for one or more segments to the server 203. As discussed above, server 203 may comprise multiple servers so that different servers may store the MPD and the one or more segments. At 309, the server 203 receives from the client 202, the one or more HTTP GET requests 308 for one or more segments.

At 310, the client 202 receives a segment 311 that was requested from the server 203. At 312, the server 203 sends the segment 311 to the client 202. One or more segments may be received by the client 202 before the client receives a second presentation description (e.g., MPD 317).

At 313, the client 202 optionally sends an HTTP GET request 314 for a second presentation description (i.e., an updated MPD) to the server 203. At 315, server 203 optionally receives the HTTP GET request 314 for the second presentation description from the client 202. The HTTP GET request 314 for the updated MPD is sent by the client 202 before a duration of a fetch interval, e.g., maximumMPDFetchInterval, has elapsed at the client 202.

At 316, the client 202 receives the second presentation description (MPD 317) from the server 203. At 318, server 203 sends the second presentation description (MPD 317) to the client 202. In a case where the client 202 did not request the second presentation description (MPD 317), such as when an OMA DM object is used, the second presentation description (MPD 317) is sent before a duration of the fetch interval has elapsed the server 203.

At 319, the client 202 sends one or more HTTP get quests 320 for one or more segments to the server 203. At 321, the server 203 receives the one or more HTTP GET requests 320 for the one or more segments. The HTTP GET requests 320 are in accordance with the second presentation description (MPD 317). As such, HTTP GET requests 320 may be to a different server as compared to the HTTP GET requests 308. Additionally, the one or more HTTP GET requests. 308 may be a partial HTTP GET request that only requests part of a segment.

At 322, the client 202 receives a segment 323 from the server 203. At 324, the server 203 sends the segment 323 the client 202. As discussed above, server sending the second presentation description (MPD 317) may be different from the server sending the segment. Furthermore this illustrates the case where the second presentation description (MPD 317) is received before the client device consumes one or more of the segments.

Figure 4:
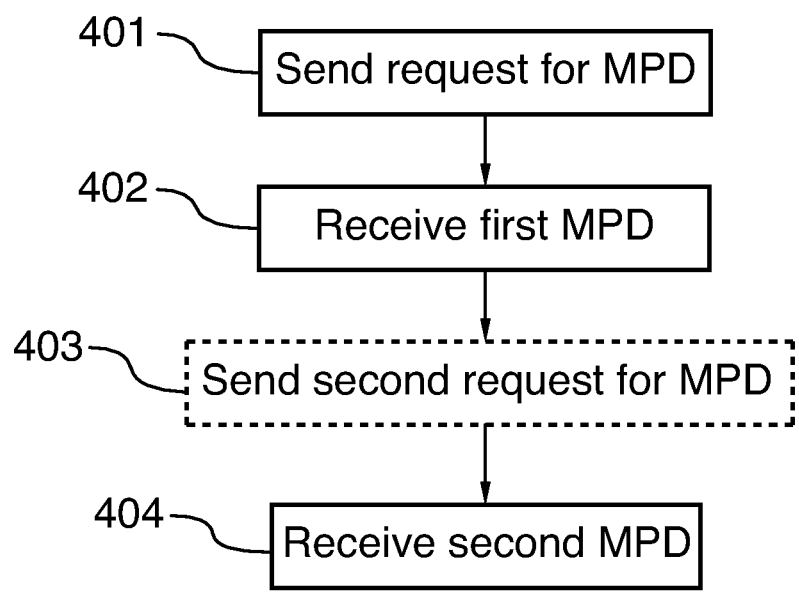
FIG. 4 is a flowchart of a method for receiving a presentation streamed via HTTP in accordance with the present disclosure.

FIG. 4 is a flowchart of a method for receiving a presentation streamed via HTTP in accordance with the present disclosure. At 401, an HTTP streaming client sends a request for content. An example of which includes a media presentation description, as discussed above.

At 402, the client receives an MPD based on the content request. The media presentation description comprises a fetch interval that indicates a duration before the end of which an updated MPD should be fetched or otherwise received by the client.

At 403, the client may optionally request an updated MPD. This request should be made by the client before a duration associated with the fetch interval has elapsed.

At 404, the client receives a second MPD. The second MPD is an updated version of the MPD received at 402 but may be the same as the MPD received at 402.

Figure 5:
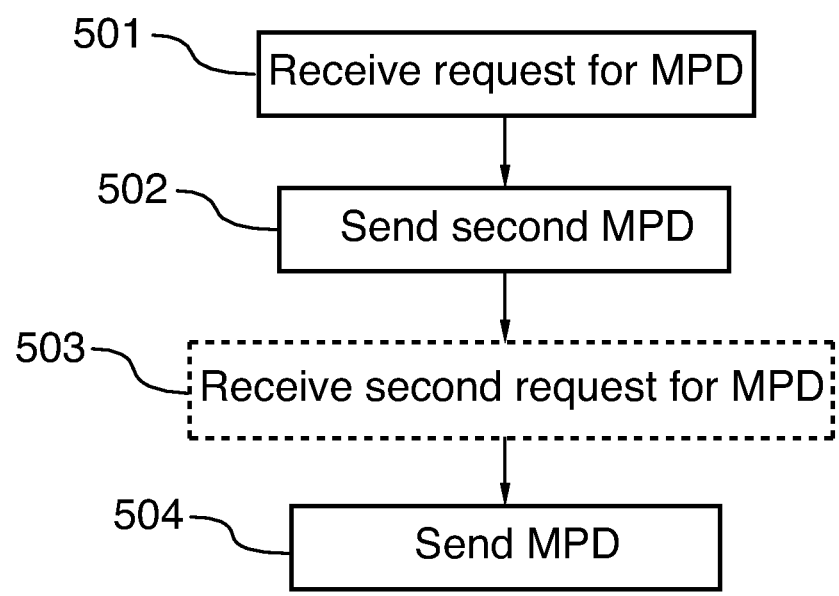
FIG. 5 is a flowchart of a method for sending a presentation streamed via HTTP in accordance with the present disclosure.

FIG. 5 is a flowchart of a method for sending a presentation streamed via HTTP in accordance with the present disclosure. At 501, a server receives a request for content. An example of which includes a media presentation description, as discussed above.

At 502, the server sends an MPD based on the content request received at 501. The MPD sent includes a duration before the end of which an updated MPD should be fetched or otherwise sent to the client.

At 503, the server may optionally receive a request for an updated MPD. The server may not receive a request from the client, such as in a case where the server is an OMA DM server that maintains a state of client.

At 504, server sends a second MPD to the client. Second MPD is an updated version of the MPD sent at 502 but maybe the same as the MPD sent at 502. Sending the second MPD may be in response to a request sent by the client before a duration associated with the fetch interval has elapsed at the client. Alternatively, sending the second MPD may be before a duration associated with the fetch interval has elapsed at the server, such as in the case where he server maintains a state of client and may use an OMA DM object to send the second MPD.

Figure 6:
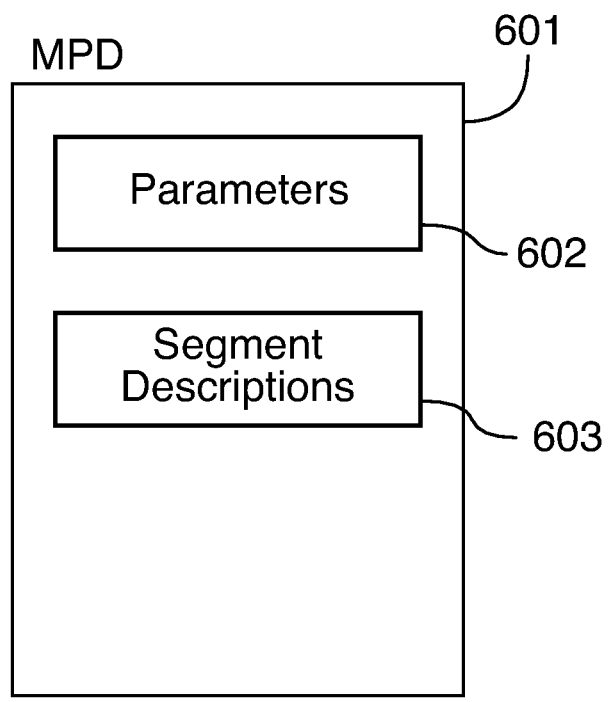
FIG. 6 is a diagram of a media presentation description in accordance with the present disclosure.

FIG. 6 is a diagram of a media presentation description in accordance with the present disclosure. The MPD 601 comprises one or more parameters 602 and one or more segment descriptions 603.

The parameters 602 include a fetch interval. Fetch interval may be a maximumFetchInterval or a minimumUpdatePeriod. Additionally, the parameters 602 may include both a maximumFetchInterval and a minimumUpdatePeriod.

The segment descriptions 603 may be in the form of a playlist, a template, or both. Furthermore, the segment descriptions 603 may have that multiple servers host one or more segments of a presentation.

What is claimed is:

1. A method for receiving a presentation streamed via HTTP, the method comprising:
   sending a first content request associated with the presentation;
   receiving a first presentation description based on the first content request, wherein the first presentation description comprises a fetch interval; and
   receiving a second presentation description before a duration associated with the fetch interval and a guard interval based on network latency is exceeded.

2. The method of claim 1, wherein the first presentation description further comprises a new presentation description location and the second presentation description is received via the new presentation description location.

3. The method of claim 1, wherein the second presentation description is received before the client device consumes one or more segments associated with the presentation.

4. The method of claim 1, wherein the first presentation description is in the form of one of a playlist structure and a template structure; the first presentation description comprises at least one reference to one or more segments associated with the presentation and each segment is associated with a uniform resource locator; the first presentation description further comprises a minimum update period associated with how often the at least one reference to one or more segments is updated; and the fetch interval is a maximum fetch interval associated with when the client device receives the second presentation description.

5. The method of claim 1, further comprising sending a second content request after receiving the first presentation description and before the duration associated with the fetch interval is exceeded.

6. The method of claim 1, wherein the first content request is a hypertext transfer protocol GET request and the first presentation description is a media presentation description.

7. The method of claim 1, wherein the second presentation description is received via an OMA DM Management Object.

8. A wireless handheld device operable to receive a presentation streamed via HTTP, the wireless handheld device comprising:
   a processor configured to:
      send a first content request associated with the presentation;
      receive a first presentation description based on the first content request, wherein the first presentation description comprises a fetch interval; and
      receive a second presentation description before a duration associated with the fetch interval a guard interval based on network latency is exceeded.

9. The wireless handheld device of claim 8, wherein the first presentation description further comprises a new presentation description location and the second presentation description is received via the new presentation description location.

10. The wireless handheld device of claim 8, wherein the second presentation description is received before the wireless handheld device consumes one or more segments associated with the presentation.

11. The wireless handheld device of claim 8, wherein the first presentation description comprises at least one reference to one or more segments associated with the presentation; each segment is associated with a uniform resource locator; the first presentation description further comprises a minimum update period associated with how often the at least one reference to one or more segments is updated; and the fetch interval is a maximum fetch interval associated with when the client device receives the second presentation description.

12. The wireless handheld device of claim 8, wherein the processor is further configured to send a second content request after receiving the first presentation description and before the duration associated with the fetch interval is exceeded.

13. The wireless handheld device of claim 8, wherein the first content request is a hypertext transfer protocol GET request and the first presentation description is a media presentation description.

14. The wireless handheld device of claim 8, wherein the second presentation description is received via an OMA DM Management Object.

15. A method for sending a presentation streamed via HTTP, the method comprising:

receiving a first content request associated with the presentation;

sending a first presentation description based on the first content request, wherein the first presentation description comprises a fetch interval; and sending a second presentation description before a duration associated with the fetch interval and a guard interval based on network latency is exceeded.

16. The method of claim 15, wherein the first presentation description further comprises a new presentation description location and the second presentation description is sent via the new presentation description location.

17. The method of claim 15, wherein the second presentation description is sent before the client device consumes one or more segments associated with the presentation.

18. The method of claim 15, wherein the first presentation description comprises at least one reference to one or more segments associated with the presentation; each segment is associated with a uniform resource locator; the first presentation description further comprises a minimum update period associated with how often the at least one reference to one or more segments is updated; and the fetch interval is a maximum fetch interval associated with when the client device receives the second presentation description.

19. The method of claim 15, further comprising receiving a second content request after sending the first presentation description and before the duration associated with the fetch interval is exceeded.

20. The method of claim 15, wherein the first content request is a hypertext transfer protocol GET request and the first presentation description is a media presentation description.

21. The method of claim 15, wherein the second presentation description is sent via an OMA DM Management Object.

22. A network server operable to send a presentation streamed via HTTP, the network server comprising:
a processor configured to:
receive a first content request associated with the presentation;

send a first presentation description based on the first content request, wherein the first presentation description comprises a fetch interval; and send a second presentation description before a duration associated with the fetch interval and a guard interval based on network latency is exceeded.

23. The network server of claim 22, wherein the first presentation description further comprises a new presentation description location and the second presentation description is sent via the new presentation description location.

24. The network server of claim 22, wherein the second presentation description is sent before the client device consumes one or more segments associated with the presentation.

25. The network server of claim 22, wherein the first presentation description comprises at least one reference to one or more segments associated with the presentation; each segment is associated with a uniform resource locator; the first presentation description further comprises a minimum update period associated with how often the at least one reference to one or more segments is updated; and the fetch interval is a maximum fetch interval associated with when the client device receives the second presentation description.

26. The network server of claim 22, further comprising receiving a second content request after sending the first presentation description and before the duration associated with the fetch interval is exceeded.

27. The network server of claim 22, wherein the first content request is a hypertext transfer protocol GET request and the first presentation description is a media presentation description.

28. The wireless handheld device of claim 22, wherein the second presentation description is received via an OMA DM Management Object.

* * * * *

UNITED STATES PATENT AND TRADEMARK OFFICE
CERTIFICATE OF CORRECTION

| | | |
|---|---|---|
| PATENT NO. | : 8,468,262 B2 | Page 1 of 1 |
| APPLICATION NO. | : 12/917431 | |
| DATED | : June 18, 2013 | |
| INVENTOR(S) | : David Stuart Furbeck | |

It is certified that error appears in the above-identified patent and that said Letters Patent is hereby corrected as shown below:

In the Claims:

Column 8, line 34 (claim 8), insert --and-- between "interval" and "a".

Signed and Sealed this
Twenty-eighth Day of January, 2014

Michelle K. Lee
*Deputy Director of the United States Patent and Trademark Office*